(12) United States Patent
Conley et al.

(10) Patent No.: US 9,395,103 B2
(45) Date of Patent: Jul. 19, 2016

(54) SYSTEM AND METHOD FOR MOUNTING PHOTOVOLTAIC MODULES

(71) Applicant: First Solar, Inc, Tempe, AZ (US)

(72) Inventors: Joshua Conley, Sylvania, OH (US); Thomas Truman, Toledo, OH (US); Eddie Bugg, Somerset, NJ (US)

(73) Assignee: First Solar, Inc., Perrysburg, OH (US)

( * ) Notice: Subject to any disclaimer, the term of this patent is extended or adjusted under 35 U.S.C. 154(b) by 118 days.

(21) Appl. No.: 14/211,984

(22) Filed: Mar. 14, 2014

(65) Prior Publication Data

US 2014/0263902 A1 Sep. 18, 2014

Related U.S. Application Data

(60) Provisional application No. 61/792,968, filed on Mar. 15, 2013.

(51) Int. Cl.
 *E04D 13/18* (2014.01)
 *F24J 2/52* (2006.01)
 *H01L 31/042* (2014.01)

(52) U.S. Cl.
 CPC .............. *F24J 2/5256* (2013.01); *F24J 2/5232* (2013.01); *F24J 2/5254* (2013.01); *H02S 20/00* (2013.01); *Y02E 10/47* (2013.01); *Y02E 10/50* (2013.01); *Y10T 29/49826* (2015.01)

(58) Field of Classification Search
 CPC ....... F24J 2/5254; F24J 2/5205; F24J 2/5211; F24J 2002/4665; F24J 2/5264; F24J 2002/5284; F24J 2002/529; F24J 2002/5486; F24J 2/5203; F24J 2/5245; F24J 2/5256; F24J 2/526; H02S 20/00
 See application file for complete search history.

(56) References Cited

U.S. PATENT DOCUMENTS

| | | | | |
|---|---|---|---|---|
| 7,836,639 | B2 * | 11/2010 | Aramaki | F24J 2/5205 248/237 |
| 8,176,693 | B2 * | 5/2012 | Abbott | F16B 2/185 52/173.1 |
| 8,234,825 | B2 * | 8/2012 | Schwarze | F24J 2/045 126/705 |
| 8,240,109 | B2 * | 8/2012 | Cusson | F24J 2/465 126/623 |
| 8,647,009 | B2 * | 2/2014 | Kobayashi | F24J 2/5205 248/237 |
| 8,745,935 | B2 * | 6/2014 | DuPont | F24J 2/5249 52/173.3 |
| 8,763,322 | B2 * | 7/2014 | Hamamura | F24J 2/5245 52/173.3 |

(Continued)

FOREIGN PATENT DOCUMENTS

| | | |
|---|---|---|
| EP | 2369266 A2 | 9/2011 |
| GB | 2453614 A | 4/2009 |

(Continued)

OTHER PUBLICATIONS

PCT International Search Report and Written Opinion, Application No. PCT/US14/25840, dated Jul. 17, 2014.

(Continued)

*Primary Examiner* — Bradley Duckworth
(74) *Attorney, Agent, or Firm* — MacMillan, Sobanski & Todd, LLC

(57) ABSTRACT

A support structure for orienting and supporting at least one solar panel includes a lock rail and a support rail that are engaged together through a locking mount. The locking mount has a retaining pin that permits the locking rail to be connected to the support rail without tools. The locking mount may provide a permanent or a releasable connection that retains the solar panel to the support structure.

19 Claims, 8 Drawing Sheets

(56) References Cited

U.S. PATENT DOCUMENTS

| | | | | |
|---|---|---|---|---|
| 8,850,754 B2* | 10/2014 | Rizzo | F16B 7/0446 | 136/251 |
| 8,936,164 B2* | 1/2015 | Durney | F24J 2/5232 | 136/251 |
| 8,938,932 B1* | 1/2015 | Wentworth | H02S 20/23 | 52/173.3 |
| 9,010,041 B2* | 4/2015 | Danning | B23P 11/00 | 52/173.3 |
| 9,194,613 B2* | 11/2015 | Nuernberger | F24J 2/5256 | |
| 2009/0230265 A1* | 9/2009 | Newman | F24J 2/5205 | 248/229.11 |
| 2010/0281793 A1* | 11/2010 | McPheeters | E04D 13/1476 | 52/173.1 |
| 2011/0005512 A1* | 1/2011 | Ruesswick | F24J 2/5232 | 126/600 |
| 2011/0204193 A1* | 8/2011 | Sagayama | F24J 2/5258 | 248/176.1 |
| 2011/0220596 A1* | 9/2011 | Cusson | F24J 2/5207 | 211/41.1 |
| 2011/0272372 A1* | 11/2011 | Peter | F16B 5/065 | 211/124 |
| 2011/0290307 A1* | 12/2011 | Workman | F24J 2/5211 | 136/251 |
| 2012/0111393 A1* | 5/2012 | Conley | H02S 20/00 | 136/251 |
| 2012/0298817 A1* | 11/2012 | West | F24J 2/5211 | 248/220.22 |
| 2012/0312357 A1* | 12/2012 | Sagayama | F24J 2/523 | 136/251 |
| 2013/0008103 A1* | 1/2013 | Sagayama | F24J 2/5232 | 52/173.3 |
| 2013/0098858 A1* | 4/2013 | Cusson | A47B 47/00 | 211/189 |
| 2013/0139870 A1* | 6/2013 | Nuernberger | H02S 20/00 | 136/251 |
| 2013/0291479 A1* | 11/2013 | Schaefer | F24J 2/5245 | 52/745.21 |
| 2013/0291927 A1* | 11/2013 | Luo | H01L 31/052 | 136/246 |
| 2013/0320162 A1* | 12/2013 | Kemple | F24J 2/525 | 248/156 |
| 2013/0335877 A1* | 12/2013 | Keller | H01R 4/64 | 361/220 |
| 2014/0174510 A1* | 6/2014 | Kanbara | H01L 31/0482 | 136/251 |
| 2014/0230886 A1* | 8/2014 | Werner | H01L 31/0422 | 136/251 |
| 2014/0263899 A1* | 9/2014 | Harris | F24J 2/5245 | 248/220.21 |
| 2015/0107168 A1* | 4/2015 | Kobayashi | F24J 2/5245 | 52/173.3 |
| 2015/0144580 A1* | 5/2015 | Kitano | F24J 2/5207 | 211/41.17 |
| 2015/0188483 A1* | 7/2015 | Nishio | H02S 20/23 | 136/259 |
| 2015/0316086 A1* | 11/2015 | Urban | F16B 7/187 | 403/374.3 |

FOREIGN PATENT DOCUMENTS

| | | |
|---|---|---|
| WO | 2007079584 A2 | 7/2007 |
| WO | 2009032862 A2 | 3/2009 |
| WO | 2010047656 A1 | 4/2010 |
| WO | 2012045129 A2 | 4/2012 |

OTHER PUBLICATIONS

DynoRaxx Classic FR, "Guide to Code Compliant Installation," Solar Power International, Booth #1783, pp. Cover & 21.

* cited by examiner

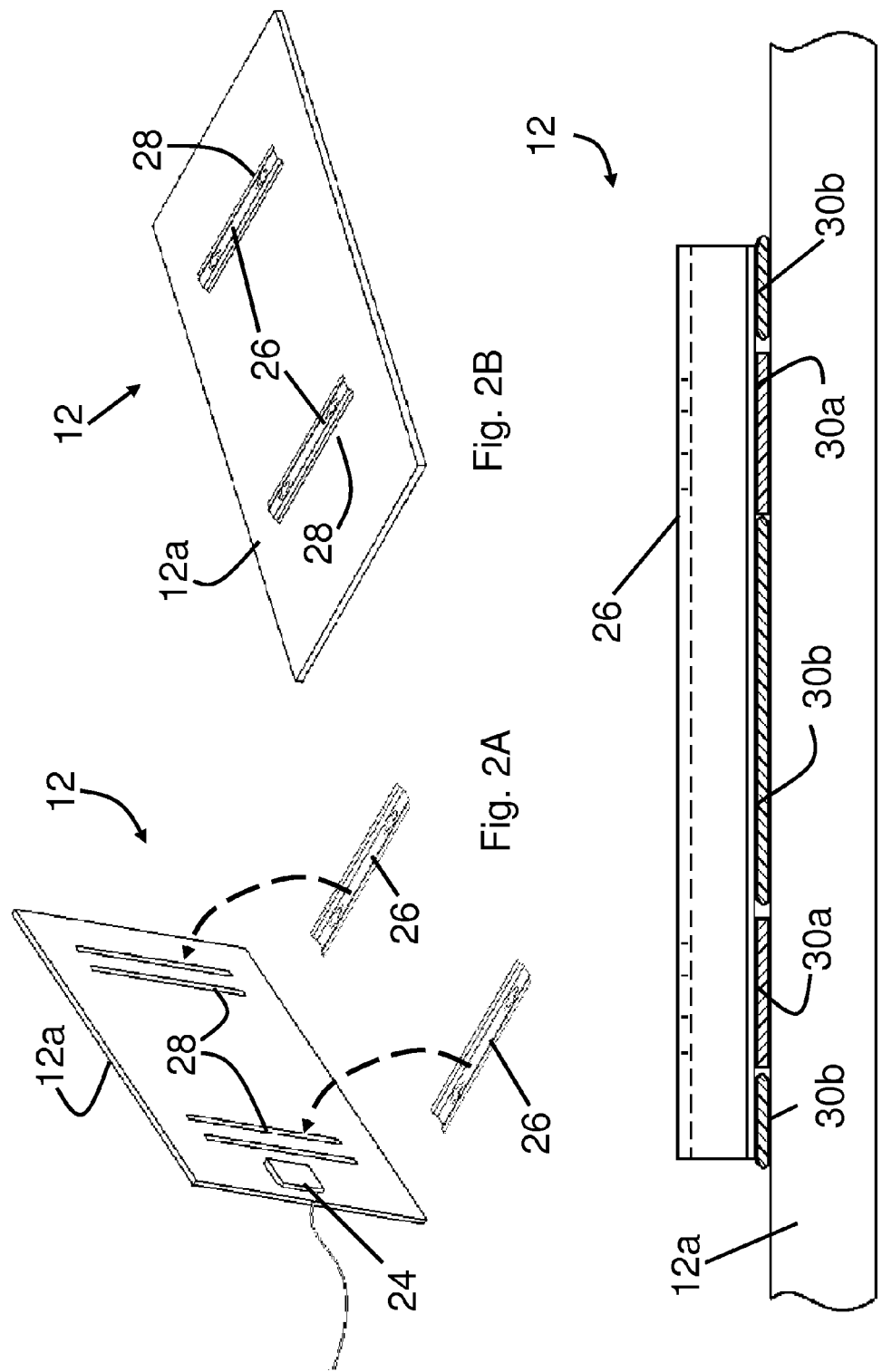

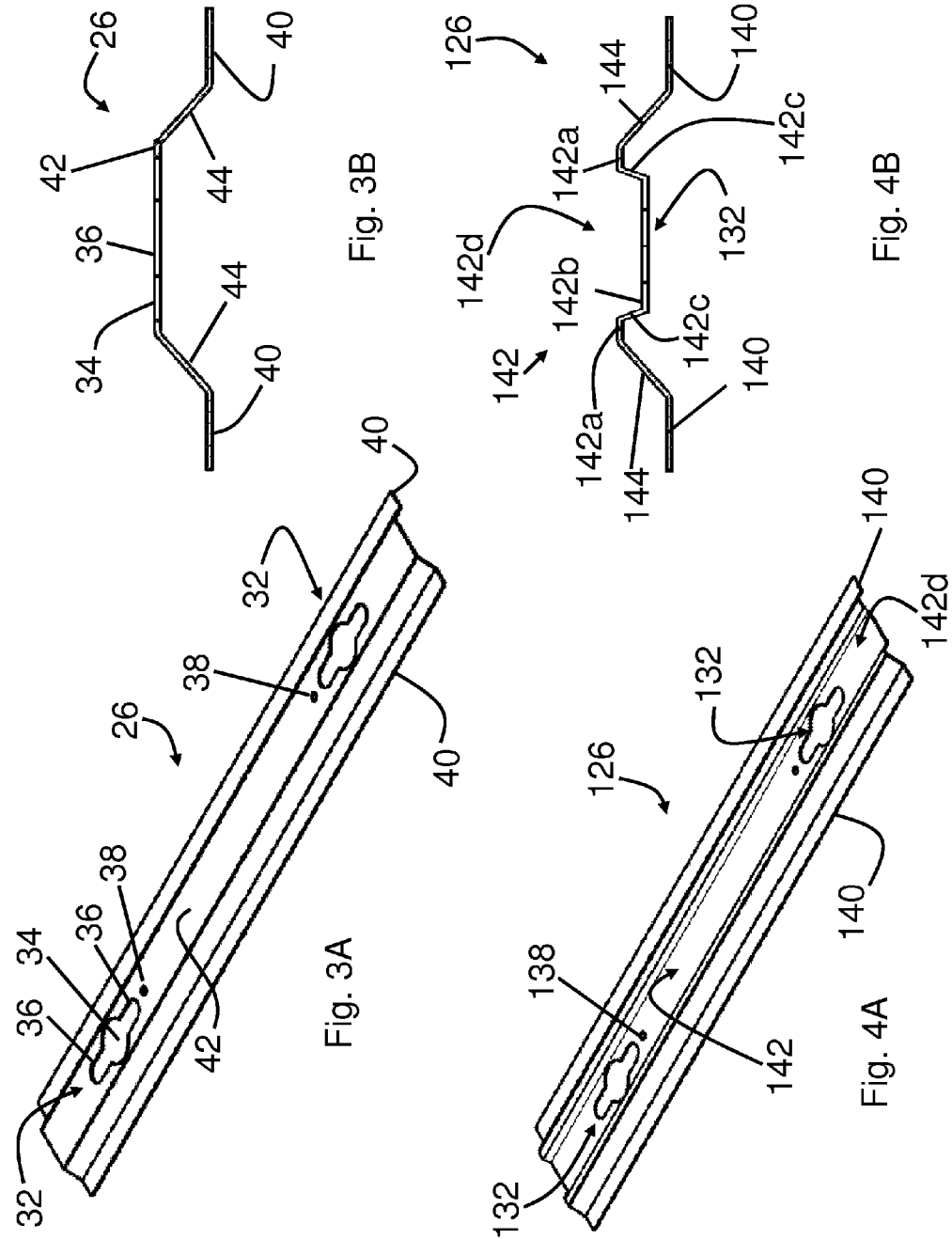

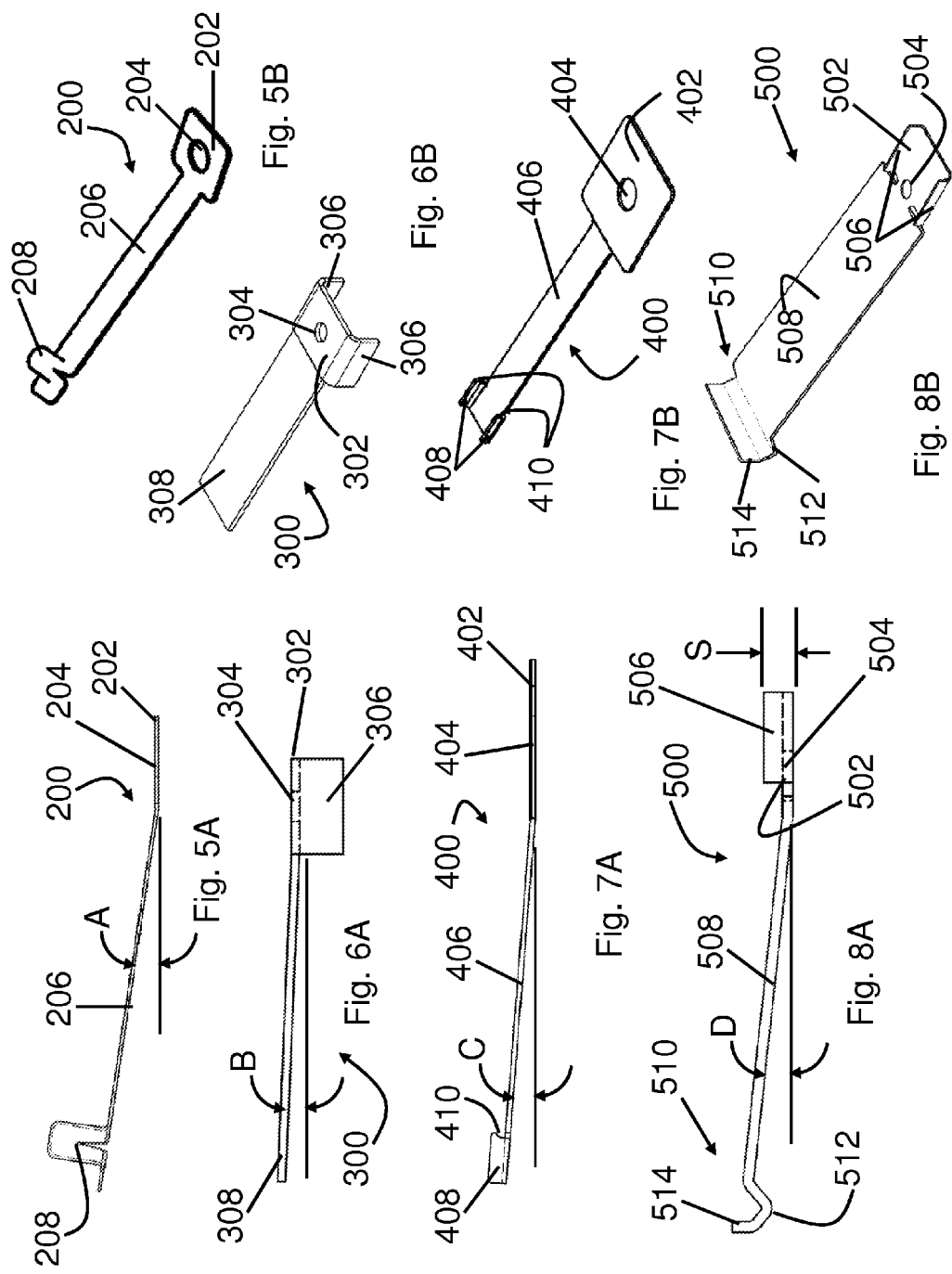

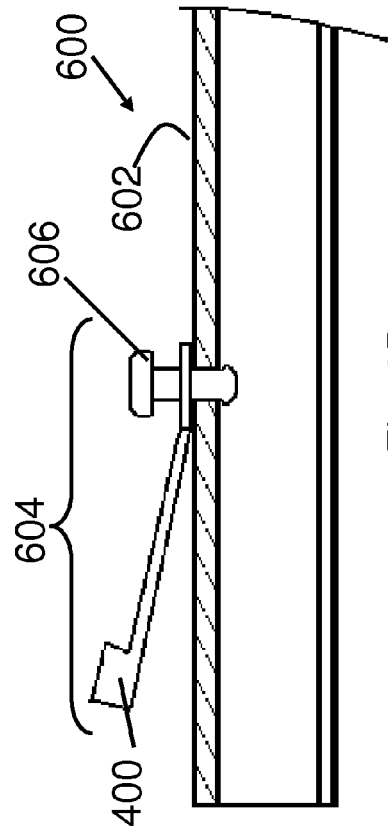
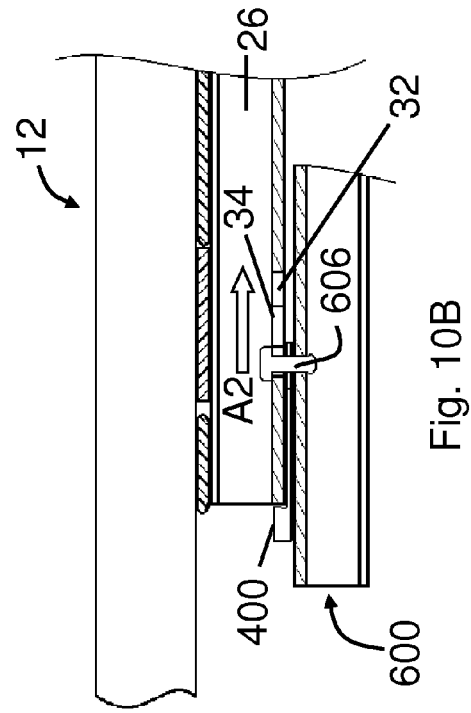
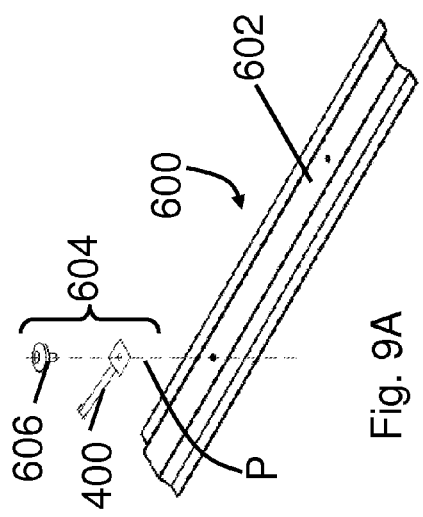
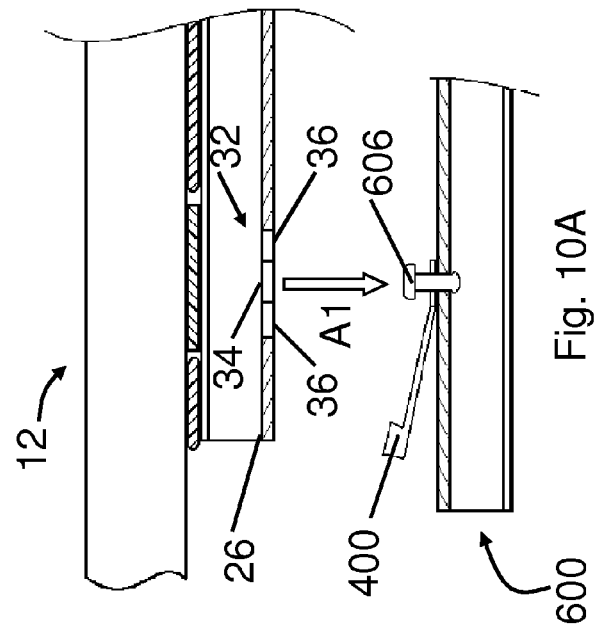
Fig. 9A
Fig. 9B
Fig. 10A
Fig. 10B

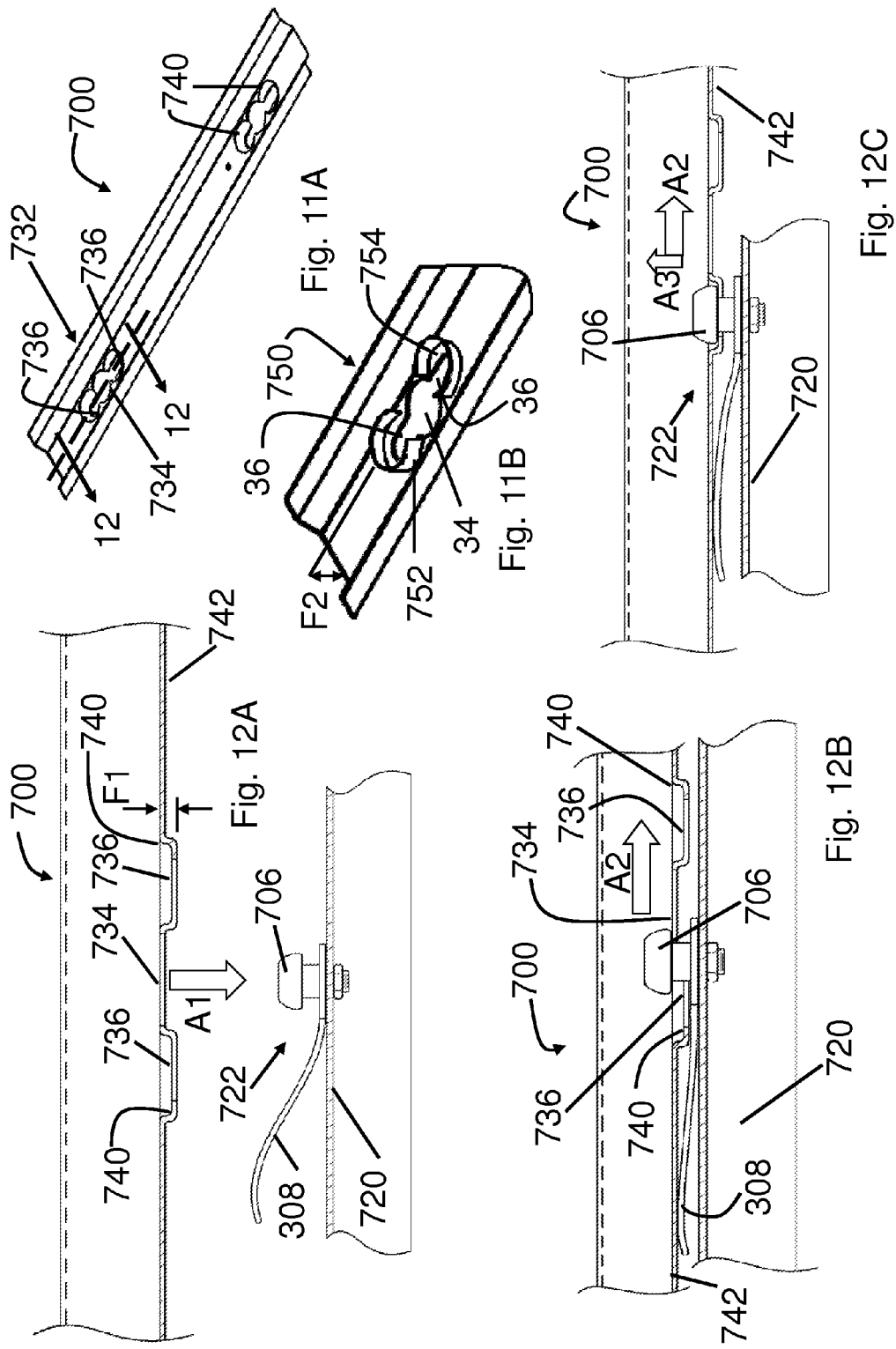

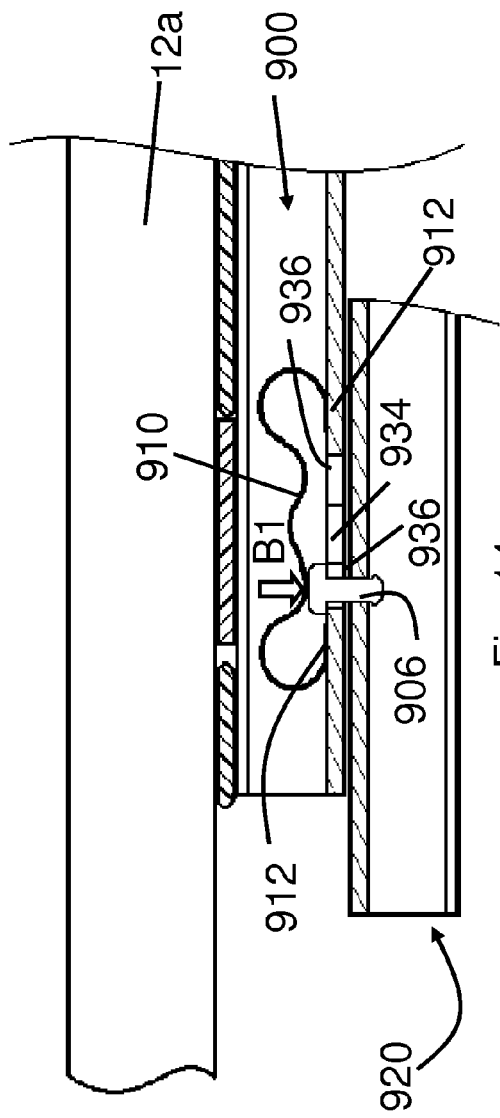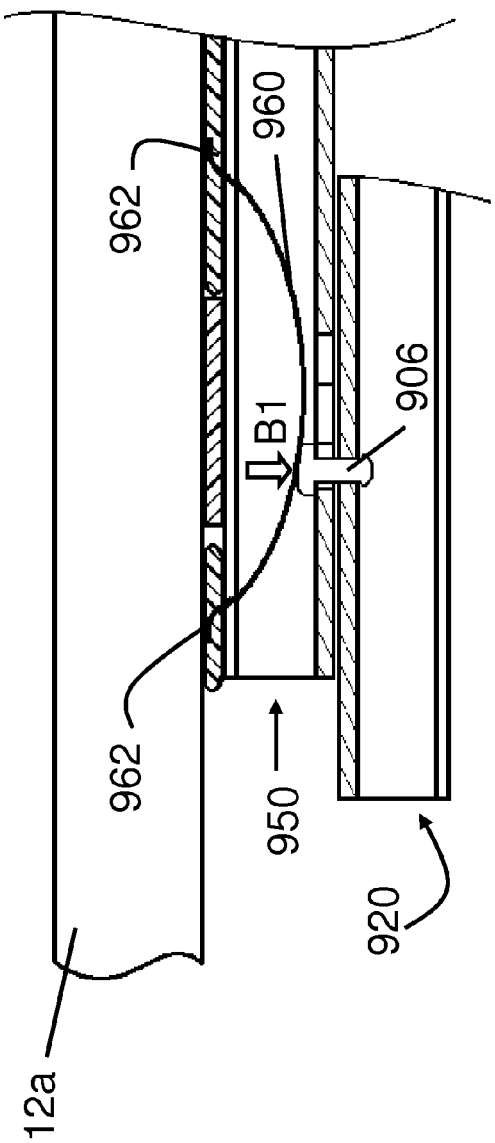

SYSTEM AND METHOD FOR MOUNTING PHOTOVOLTAIC MODULES

CROSS-REFERENCE TO RELATED APPLICATIONS

This application claims the benefit of U.S. Provisional Application No. 61/792,968, filed Mar. 15, 2013, the disclosure of which is incorporated herein by reference.

BACKGROUND OF THE INVENTION

This invention relates in general to a system and method for mounting photovoltaic modules. In particular, this invention relates to a spring-tensioned mounting assembly having cooperating retaining structures.

Photovoltaic devices, such as solar panels, are know for converting sunlight into electricity. The solar panels admit sunlight through a front window, where photons provide exciting energy to release electrons from layers of semiconductor materials and produce a voltage potential and a flow of current. Because of the need for sunlight, solar panels are often mounted outside. Additionally, multiple panels are mounted together in the form of modules or arrays to collect a maximum of sunlight. The mounting arrangements of solar panel arrays need to provide sturdy support that can resist environmental factors. In addition, it is of benefit to have solar panel mounts that are easy to assembly and reduce the amount of labor required for assembly. Thus, it would be desirable to provide an improved solar panel or photovoltaic module mounting structure.

SUMMARY OF THE INVENTION

This invention relates to a support stand and photovoltaic module array. In one embodiment, the support stand may include a plurality of support rails arranged to form a mounting deck. The mounting deck is adjustable to an angle of inclination, and the plurality of support rails include at least one locking mount. The at least one locking mount has a lock spring and a retaining pin. The retaining pin has a shank defining an axis and a button-head. The support stand further includes a plurality of lock rails attached to the plurality of support rails. The lock rails have at least one locking aperture. The at least one locking aperture includes a central aperture that is sized to permit the button head of the retaining pin to pass through. The at least one locking aperture further includes at least one slot extending from the central aperture. The at least one slot is sized to permit the retaining pin shank to pass through and to prevent the button head of the retaining pin from passing through the slot along the retaining pin axis. The lock spring biases at least one of the plurality of lock rails away from at least one of the plurality of support rails.

In another aspect of the invention, a support stand and photovoltaic module includes at least one support rail having a retaining pin defining a pin axis. The retaining pin includes a shank and a button-head, and the button head has at least one portion extending radially beyond the diameter of the shank. The support stand and photovoltaic module further includes at least one lock rail attached to a solar panel to form the photovoltaic module. The lock rail has a locking aperture including a central aperture and a slot. A lock spring is configured to produce a biasing force that produces a frictional engagement between the retaining pin and a portion of the lock rail such that the frictional engagement increases a force necessary to move the lock rail relative to the support rail from an engaged position where the PV module is fixed to the support rail to a position where the retaining pin is generally aligned with the central aperture.

In yet another aspect of the invention a support stand and photovoltaic module includes at least one support rail having a retaining pin defining a pin axis, where the retaining pin includes a shank and a button-head. The button head has at least one portion extending radially beyond the diameter of the shank. An at least one lock rail is attached to a solar panel to form the photovoltaic module, and the lock rail has a locking aperture including a central aperture and a slot. The support stand and photovoltaic module further includes a lock spring configured to produce a biasing force, where the lock spring has a mechanical retaining feature that engages a portion of one of the support rail and the lock rail such that the biasing force maintains the mechanical feature in contact to prevent the lock rail from being disengaged from the support rail.

In another aspect of the invention, a support stand for photovoltaic modules includes a plurality of lower supports arranged to form a mounting deck. A plurality of upper supports are connected to the plurality of lower supports. The upper supports have a plurality of photovoltaic modules mounted thereon. A locking arrangement interconnects a selected one of the upper supports to a selected one of the lower supports. The locking arrangement is defined by a retaining pin mounted on one of the selected lower and upper supports. A lock aperture is provided in the other one of the selected lower and upper supports. A spring is operatively connected between the selected lower and upper supports to resist movement of the selected upper support relative to the lower support. The retaining pin defines an axis and has a shank and a head. The lock aperture has a main opening and a slot extending from the main opening for receiving the retaining pin. The main opening is sized to permit the head of the retaining pin to pass through, and the slot is sized to permit the retaining pin shank to pass through but to prevent the head of the retaining pin from passing through the slot along the retaining pin axis.

In still yet another aspect of the invention, there is disclosed a method of assembling a photovoltaic module to a support structure. The assembly method includes the steps of:

a) attaching a lock rail to a solar panel to form a photovoltaic module, the lock rail having a locking aperture that includes a central aperture and at least one slot.

b) orienting a support rail for assembly of the photovoltaic module to the support rail, the support rail including a retaining pin having a head portion and a shank portion wherein the head portion has a larger geometric feature than the shank portion;

c) attaching a lock spring to one of the lock rail, the support rail, and the solar panel, the lock spring configured to bias the lock rail relative to the retaining pin;

d) locating the lock rail in relating to the retaining pin such that the head portion is generally aligned with the central aperture;

e) moving the central aperture over the retaining pin such that the bias of the lock spring is overcome and the shank portion is aligned with the slot; and f) moving the lock rail relative to the support rail such that the shank portion enters the slot and the bias causes the head portion to contact the lock rail.

Various aspects of this invention will become apparent to those skilled in the art from the following detailed description of the preferred embodiment, when read in light of the accompanying drawings.

BRIEF DESCRIPTION OF THE DRAWINGS

FIG. 2A is an exploded view of a back side of a photovoltaic panel and an attaching lock rail prior to assembly.

FIG. 2B is a perspective view of the back side of the assembled photovoltaic panel and lock rail structure of FIG. 2A.

FIG. 2C is an enlarged, elevation view, in partial cross section, of the attachment of the lock rail to the photovoltaic panel of FIG. 2B.

FIG. 3A is a perspective view of a first embodiment of a lock rail.

FIG. 3B is an end view of the lock rail of FIG. 3A.

FIG. 4A is a perspective view of a second embodiment of a lock rail.

FIG. 4B is an end view of the lock rail of FIG. 4A.

FIG. 5A is an elevational view of a first embodiment of a lock spring.

FIG. 5B is a perspective view of the lock spring of FIG. 5A.

FIG. 6A is an elevational view of a second embodiment of a lock spring.

FIG. 6B is a perspective view of the lock spring of FIG. 6A.

FIG. 7A is an elevational view of a third embodiment of a lock spring.

FIG. 7B is a perspective view of the lock spring of FIG. 7A.

FIG. 8A is an elevational view of a fourth embodiment of a lock spring.

FIG. 8B is a perspective view of the lock spring of FIG. 8A.

FIG. 9A is an exploded, perspective view of a support rail assembly having a support rail, lock spring, and retaining pin.

FIG. 9B is an elevational view, in partial cross section, of the support rail assembly of FIG. 9A.

FIG. 10A is an elevational view, in partial cross section, showing a first step in a method of assembling the photovoltaic panel and support structure of FIG. 1.

FIG. 10B is an elevational view, in partial cross section, showing a second step in the method of assembling the photovoltaic panel and support structure of FIG. 1.

FIG. 11A is a perspective view of a third embodiment of a lock rail.

FIG. 11B is a partial, perspective view of a fourth embodiment of a lock rail, similar to the lock rail of FIG. 10A.

FIG. 12A is an elevational view, in partial cross section, showing a first step in a method of assembling the lock rail of FIG. 11A to a support rail of a support structure.

FIG. 12B is an elevational view, in partial cross section, showing a second step where the lock rail is in an intermediate position in the assembly method of FIG. 12A.

FIG. 12C is an elevational view, in partial cross section, showing a third step where the lock rail is at a final position in the assembly method of FIG. 12A.

FIG. 14 is an elevational view, in partial cross section, of a third embodiment of an assembled photovoltaic panel and support structure.

FIG. 15 is an elevational view, in partial cross section, of a fourth embodiment of an assembled photovoltaic panel and support structure.

DETAILED DESCRIPTION OF THE PREFERRED EMBODIMENT

Figure 1:
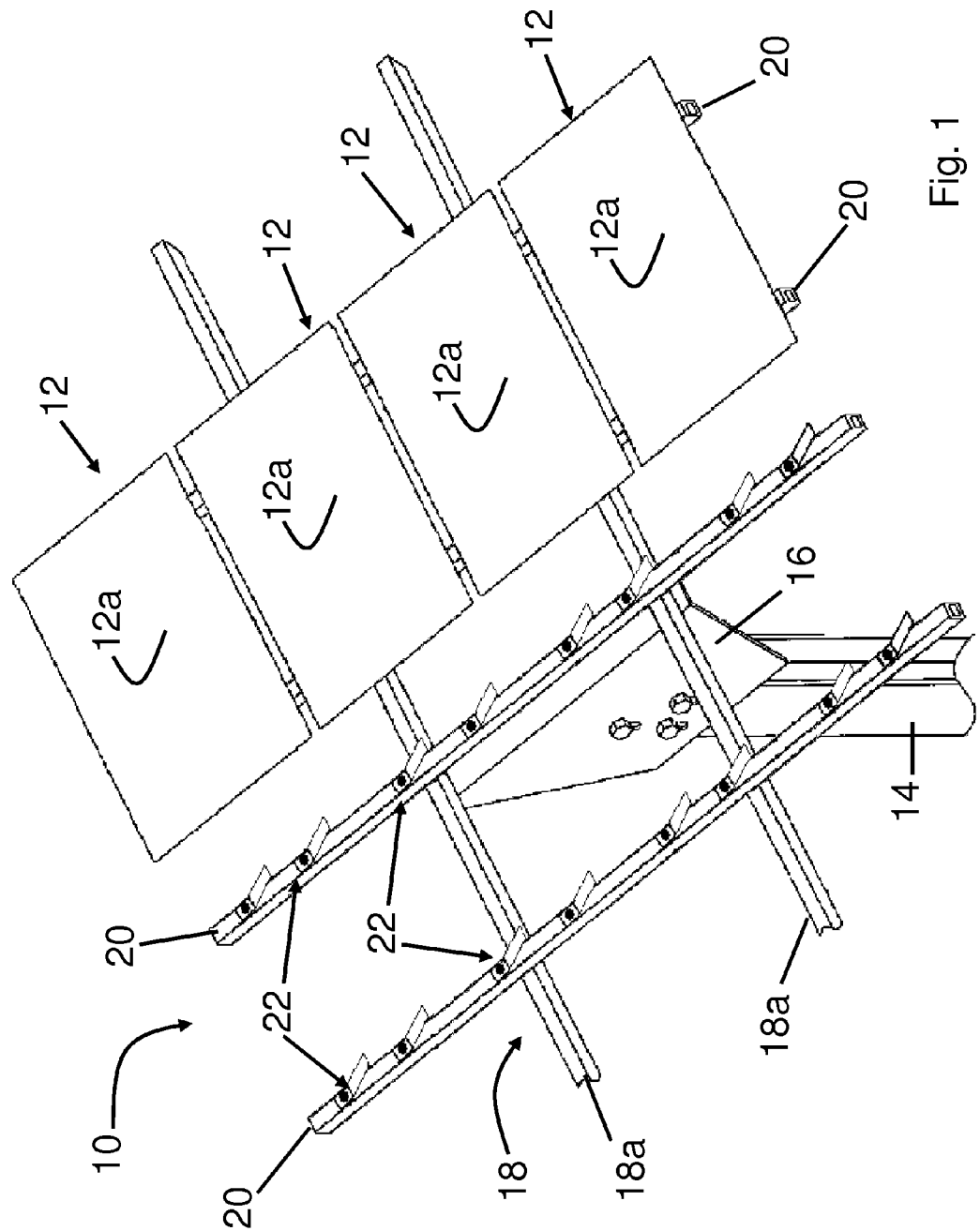
FIG. 1 is a perspective view of a partially assembled photovoltaic array and support structure.

Referring now to the drawings, there is illustrated in FIG. 1 an embodiment of a support stand, indicated generally at 10, for mounting and positioning a plurality of photovoltaic (PV) modules 12. The PV modules 12 include a photovoltaic or solar panel 12a that is attached to a mounting structure, as will be explained below. The support stand 10 includes a support post 14 that is configured to anchor the support stand relative to the mounting surface, such as the ground, roof, or other location where solar panels are typically arranged. A pivot plate 16 is attached to the support post 14 and is angularly adjustable to position the PV modules 12 in relationship to the sunlight rays. The pivot plate 16 may be mounted in any angle-adjustable manner and may be configured to pivot in any desired plane, attitude, or angle of inclination desired. A mounting deck 18, illustrated as two spaced apart mounting rails 18a, are fixed to the pivot plate 16. The mounting deck 18 may be any suitable platform, solid or open, that can support the PC modules and attachment hardware. A plurality of support rails 20 are attached to the mounting rails 18a. The support rails 20 and mounting rails 18a may be pivotally attached where they cross such that the assembled rails 18 and 20 may be drawn open from a shipping position, where the mounting rails 18a are generally abutting each other below the support rails 20, which may also be abutting and generally parallel to the mounting rails 18a, though such is not required. The support rails 20 include a plurality of spaced-apart locking mounts, shown generally at 22. The locking mounts 22, as will be described below, may include a spring element and a lock pin. The spring element provides a biasing force in certain embodiments that creates a frictional contact between the lock pin and the lock rail to retain the PV module to the support stand. The locking mounts 22 may alternatively include only a retaining pin and alternate along the support rail 20 with locking mounts having a spring element. Though the support rails 20 are illustrated as closed box cross sections, the support rails 20 may be formed having any desired geometry.

Referring now to FIGS. 2A, 2B, and 2C, there is illustrated the PV modules 12 in varying stages of assembly. As shown in FIG. 2A, the PV module 12 includes the solar panel 12a and a cord plate 24 for electrically connecting the solar panels 12a to a grid or other output. One or more lock rails 26 are fixed on the outermost surface of the solar panel 12a, as shown in FIG. 2B. As shown in FIGS. 2A and 2C, in one embodiment, the adhesive 28 is applied to the outermost surface of the panel 12a. As shown in FIG. 2C, two or more adhesives may be applied to secure the lock rails 26 to the solar panel 12a, such as a first adhesive 30a that is a fast securing adhesive, such as a pressure sensitive tape, energy cured (light, heat, microwave, etc,) adhesive, and the like, and a second adhesive 30b, which is formulated for strength and environmental resistance and may be a flow-able, slow curing material.

Referring now to FIGS. 3A and 3B, there is illustrated a first embodiment of the lock rail, shown generally at 26. The lock rail 26 includes at least one locking aperture 32. Though two spaced-apart locking apertures 32 are illustrated in FIG. 3A, any suitable number of apertures may be provided. The locking aperture 32 includes a central opening 34 and at least one slot 36 extending from and opening into the central opening 34. In the illustrated embodiment, two slots 36 are axially aligned on opposite sides of the central opening 34 to facilitate orientation and attachment of the lock rail 26 relative to the support rails 20. The lock rail 26 also may include repair apertures 38 formed adjacent to the locking apertures 32 to provide alternate attachment points in the event that the lock rail 26 cannot be attached to the support rails 20. Additionally, the repair apertures 38 may be used to provide an additional attachment or locking structure in conjunction with the cooperating locking mounts 22 and locking apertures 32. The lock rail 26 includes a mounting surface, illustrated as two mounting flanges 40, shown in FIG. 3B. The mounting flanges 40 provide a sufficient surface area to fix the lock rails 30 to the solar panels 12*a*. The lock rail 26 further includes an attachment face 42 that is spaced apart from the mounting flanges 40. In the illustrated embodiment, the attachment face 42 is generally planar and parallel to the mounting flanges 40. The attachment face 42 is spaced apart from the mounting flanges 40 a sufficient distance to permit a locking mechanism, such as a retaining pin, bolt, or other structure to pass through the central aperture 34 and a portion of which to slide into engagement with the slot 36. The locking rail 26 is illustrated having two angled side walls 44 that connect the attachment face 42 to the mounting flanges 40. Though shown as having angled side walls 44, outwardly extending mounting flanges, 40 and a planar attachment face 42, the lock rail 26 may be formed from any desired shape, such as box sections (square or rectangular, round, oval, I-beam shaped, and the like.

Referring now to FIGS. 4A and 4B, there is illustrated a second embodiment of a lock rail, shown generally at 126. The lock rail 126 includes at least one locking aperture 132, illustrated as similarly configured to the locking aperture 32, though such is not required. The lock rail 126 may further include one or more repair apertures 138. The lock rail includes mounting flanges 140 that form a generally planar mounting surface configured to be fixed to solar panels 12*a*. The lock rail 126 includes an attachment face 142 that is spaced apart from the plane of the mounting flanges 140. The attachment face 142 includes an upper face 142*a*, a lower face 142*b*, and guide walls 142*c*. The lower face 142*b* and guide walls 142*c* form a guide channel 142*d* that guides the positioning of the solar panel 12*a*, with the lock rail 126 attached thereto, relative to the support rails 20. The guide channel 142*d* maintains the locking mounts 22, and the locking structure such as a retaining pin, between the guide walls and in the lateral vicinity of an axis that intersects the locking apertures 132. Thus, the guide channel 142*d* permits an installer to limit movement of the PV modules to the known axis of the locking apertures 132 when attaching PV modules to the support rails 20. This is beneficial because the installer cannot easily see the locking mounts 22 once the PV module, such as PV module 12, is positioned over the support rails 20.

Referring now to FIGS. 5A and 5B, there is illustrated a first embodiment of a lock spring, shown generally at 200. The lock spring 200 includes a mounting pad 202 having a mounting aperture 204 formed therethrough. In one embodiment, the lock spring 200 is mounted to the support rail 20. In other embodiments, the lock spring 200 may be mounted to the lock rail, if desired. The lock spring 200 includes a spring element 206, illustrated as a cantilever spring. The spring element 206 extends from the mounting pad 202 at an angle, A. In one particular embodiment, the angle A may be about 5 degrees, though the angle can be varied in proportion to the angle of inclination of the mounting panel 18 as it is increased in order to increase the bias force. The spring element 206 terminates in a cup-shaped projection 208. The button 208 is illustrated a being formed integrally with the spring element 206 during a stamping operation. Alternatively, the projection 208 may be a separate component that is fixed to the end of the spring element 206. The projection 208 is further illustrated as having a cup shape, though other geometric shapes, such as a folded, flat, extending blade shape, triangle shape, or other extending feature.

Referring now to FIGS. 6A and 6B, there is illustrated a second embodiment of a lock spring, shown generally at 300. The lock spring 300 includes a mounting pad 302 having a mounting aperture 304 and optional alignment flanges 306. In one embodiment, the lock spring 300 is mounted to the support rail 20. In other embodiments, the lock spring 300 may be mounted to the lock rail, if desired. The lock spring 300 includes a spring element 308, illustrated as a cantilever spring. The spring element 308 extends from the mounting pad 302 at an angle, B. In one particular embodiment, the angle B may be about 2.5 degrees, though the angle can be varied in proportion to the angle of inclination of the mounting panel 18 as it is increased in order to increase the bias force. The mounting flanges 306 extend from the mounting pad 302, adjacent to the spring element 308, and in an opposite direction away from the angle of the spring element 308. The mounting flanges 306 are provided to orient the lock spring 300 relative to the support rails 20 and may also be configured to resist rotations associated with securing a retaining screw (not shown) to maintain proper alignment during assembly. Alternatively, the mounting flanges 306 may be a singular mounting flange, a protrusion or dimple, tab and cooperating slot (formed in the mating support rail) that engage the support rail 20 to prevent the lock spring from twisting out of position when secured. The spring element 308 of the lock spring 300 provides a biasing force between the lock rail 26 and the support rail 20 to maintain the PV module 12 in the assembled and locked position.

Referring now to FIGS. 7A and 7B, there is illustrated a third embodiment of a lock spring, shown generally at 400. The lock spring 400 includes a mounting pad 402 having a mounting aperture 404 formed therethrough. In one embodiment, the lock spring 400 is mounted to the support rail 20. In other embodiments, the lock spring 400 may be mounted to the lock rail, if desired. A spring element 406 extends from the mounting pad 402, in a cantilevered configuration, at an angle, C. In one particular embodiment, the angle C may be about 4.5 degrees, though the angle can be varied in proportion to the angle of inclination of the mounting panel 18 as it is increased in order to increase the bias force. The spring element 406 terminates in a pair of locking barbs 408. Though illustrated as two spaced apart locking barbs 408, extending parallel to the spring length such is not required. A single barb may be provided that is centrally located on the end of the spring element 406. Alternatively the locking barb 408 may be located at the end and oriented across the width of the spring element 406. The lock spring 400 provides a biasing force between the lock rail 26 and the support rail 20 to maintain the PV module 12 in the assembled and locked position. The locking barbs 408, when mounted to the support rail 20, deflect into engagement with a portion of the lock rail 26 to retain the PV module on the support rail 20.

Figure 13:
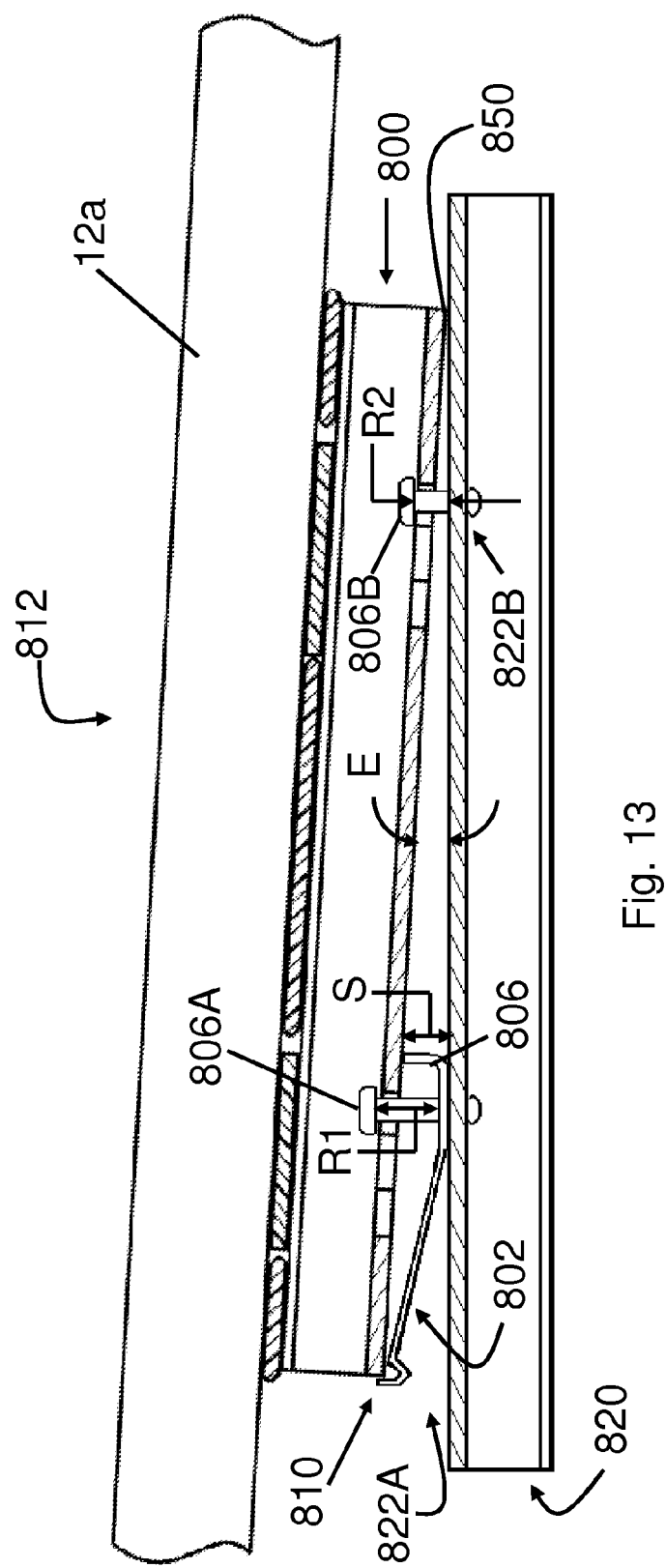
FIG. 13 is an elevational view of a second embodiment of an assembled photovoltaic panel and support structure.

Referring now to FIGS. 8A and 8B, there is illustrated a fourth embodiment of a lock spring, shown generally at 500. The lock spring 500 includes a mounting pad 502 and a mounting aperture 504 formed therethrough. The mounting pad 502 is illustrated having a pair of spaced-apart, spacer flanges 506. Though shown as two spacer flanges 506 positioned adjacent to a spring element 508, a single spacer flange 506 may be provided at either adjacent side or at a side of the mounting pad 502 across from the spring element 508, as shown in the embodiment of FIG. 13. The spring element 508 extends from the mounting pad 502, in a cantilevered configuration, at an angle, D. In one particular embodiment, the angle D may be about 6 degrees, though the angle can be varied in proportion to the angle of inclination of the mounting panel 18 as it is increased in order to increase the bias force. The spacer flanges 506 extend a distance, S, above the surface of the support rail 20. The spacer flanges 506 provide a standoff of the lock rail, such as lock rail 26, as the PV module 12 is assembled onto the support rail 20. The standoff dimension, S, provides a shingle effect to the assembled PV modules where the assembled PV modules are staggered and not arranged in a strict planar array. The spring element 508 terminates in a lock hook, shown generally at 510. The lock hook 510 includes a lower stop 512 that extends below the spring element 508 and prevents over-articulation and yielding of the spring element as the lock rail 26 is assembled onto the support rail 20. The lock hook 510 further includes a stop 514 that projects above the spring element 508 to retain the lock rail 26, as shown in the embodiment of FIG. 13.

Referring now to FIGS. 9A and 9B, there is illustrated an embodiment of a support rail, shown generally at 600. The support rail 600 includes a rail 602 that is similar in function to the support rail 20 described above and illustrates one of the many alternative geometries that may be used. The support rail 600 includes a locking mount, shown generally at 604, that is similar in function to the locking mount 22, described above. The locking mount 604 is illustrated as including the lock spring 400, though any lock spring or combination of lock springs, such as lock springs 400 and 300 extending in opposite directions, may be used, if desired. The lock spring 400 is fixed to the lock rail 602 by a retaining pin 606. The retaining pin 606 may be a bolt, a rivet, a rivet head with an extending threaded shank, an internally threaded rivet nut (and bolt or stud), a welded rivet, or any other suitable structure having a shape (including non-circular shapes) that retains the lock rail onto the support rail. As shown in FIG. 9B, the retaining pin 606 is a button-headed rivet that extends through the mounting aperture 404 of the lock spring 400 and firmly seats the mounting pad 402 against the surface of the support rail. The button-head portion is larger than the rivet shank, as is typical for this type of structure. The central aperture 34 of the locking aperture 32 is sized to permit the button-head of the retaining pin 606 to pass through, generally in line with a retaining pin axis, P, that is generally parallel or collinear with the retaining pin shank. The slots 36 are configured to permit the shank of the retaining pin 606 to pass through, yet small enough such that the button-head prevents the lock rail 26 from axially separating from the support rail 600 along the retaining pin axis.

Referring now to FIGS. 10A and 10B, there is illustrated a method of assembling the PV module 12, with the attached lock rail, such as lock rail 26, to the support rail 600. Typically, the post 14 and pivot plate 16 of the support stand 10 are assembled and anchored at the desired site. As described above, the mounting rails 18*a* and support rails 600 are assembled to form the planar mounting deck surface. The locking mounts 22 may be preassembled to the support rails 600 or installed on site. Once assembled, the PV modules 12, with the fixed lock rails in place, are positioned over the support rails 600. As described above, the attachment face 42, 142 of the lock rails 26, 126 are positioned over the retaining pins 606. The attachment face 42 and 142 may contact the top of the button-head of the retaining pin 606 allowing the lock rail 26, 126 to slide into position where the button-head can enter into the central aperture 34. As described above, when the lock rail 126 is positioned on the support rail 600, the guide channel 142*d* permits positioning of the solar panel 12*a* by sliding the lock rail 126 along the retaining pin 606 while maintaining the lateral (side to side) position of the PV module 12.

As shown in FIG. 10B, the button-head portion of the retaining pin 606 is aligned with the central aperture 34, and the PV module 12 is moved in the direction of arrow A1 toward the support rail 20. The button-head of the retaining pin 606 extends through the central aperture, and the lock spring 400 is compressed against the support rail 600. The various lock spring embodiments described above may be deflected by various amounts and may maintain a residual gap between the various embodiments of the lock rail and the support rail, or the rails may be positioned against the fully deflected lock spring. Once the lock spring is suitably compressed, the PV module 12 is moved in the direction of arrow A2 such that the shank of the retaining pin 606 engages the slot 36. As the PV module 12 is moved into position, the lock spring 400 rebounds from the deflected state into a locked position which prevents the lock rail from being moved to release the retaining pin. Such a configuration results in a generally permanent connection where some destruction of the locking assembly (either the lock spring or the retaining pin) facilitates release of the PV module 12. In other embodiments, the attachment is releasable such that the lock spring may be articulated without destroying the structure.

Referring now to FIG. 11A, there is illustrated another embodiment of a lock rail, shown generally at 700. The lock rail 700 is illustrated having a similar geometry to the lock rail 26, though any suitable geometry may be used. The lock rail 700 includes a locking aperture 732 that is configured as a releasable locking aperture. The locking aperture 732 includes a central aperture 734 and opposed slots 736 that are sized and configured similarly to the central aperture 34 and slots 36 described above. The slots 736 are offset a distance, F1, from a plane defined by an attachment face 742. The offset is sufficient to capture the button-head of the retaining pin, such as a retaining pin 706 shown in FIGS. 12A-12C, within a recess 740 formed around the slot and prevent releasing the button-head due to the bias of the lock spring. In an alternative embodiment, the central aperture 734 may be offset a distance F1 in an opposite direction from slots 734, where the slots 734 are generally co-planar with the attachment face 742. The edges of the offset central aperture 734 will contact the button-head of the retaining pin 706 and prevent the shank from exiting the slot 736, similar to the embodiment of FIG. 12C. An alternative embodiment of a locking aperture is illustrated generally at 750. The slots 36 of the locking aperture 32, and in certain versions the central aperture 34, are surrounded by a retaining wall 752 that extends an offset distance F2, which may be equal to F1, though such is not required. The retaining wall 752 is sized to permit the button-head of the retaining pin to seat within a cavity 754 defined around the slot 36. In the embodiments of FIGS. 11A and 11B, the retaining pin 706 may moved from the retaining recess by overcoming the spring bias until the bottom of the button-head clears the recess edge and can be moved to the central opening 734.

Referring now to FIGS. 12A-12C, a method of assembling the lock rail 700 onto a support rail 720 having a locking mount 722 is illustrated. In a first step, the central aperture 734 of the locking aperture 732 is aligned with the retaining pin 706, as previously described, the button-head of the retaining pin is sized to pass through the central aperture 734 but not the slots 736. As the lock rail 700 is pressed toward the support rail 720 in the direction of arrow A1, the button-head enters the central aperture 734 and the lock spring 308 is compressed, as shown in FIG. 12B. The lock rail 700 is then moved in the direction of arrow A2 toward the recess 740, with the retaining pin shank engaged in the slot 736. As shown in FIG. 12C, as the button-head of retaining pin 706 seats into the recess 740, the lock rail 700 moves in the direction of arrow A3 in response to the biasing force of the lock spring 308. To remove the lock rail 700, the method steps may be reversed.

Referring now to FIG. 13, there is illustrated another embodiment of a PV module, shown generally at 812 including a fixed lock rail 800 bonded thereto. The PV module 812 is attached to a support rail 820 having a first locking mount 822A and a second locking mount 822B. The first locking mount 822A includes a retaining pin 806A having a button-head similar to the previously described embodiments above, and a shank having a length of R1. The retaining pin 806A fixes a lock spring 802, similar to lock spring 500 described above, to the support rail 820. The lock spring 800 is similar in configuration to the lock spring 500 but includes only one spacer flange 806 spaced across from a spring element 808 having a lock hook 810, similar to spring element 508 and lock hook 510. The spacer flange 806 provides an offset distance S between the lock rail 800 and the support rail 820 at the locking mount 822A. The second locking mount 822B includes a retaining pin 806B having a button-head similar to the previously described embodiments above, and a shank having a length of R2. The shank length R2 is shorter than shank length R1. The second locking mount 822B is illustrated as not including a lock spring, tough one may be provided in alternative embodiments. The height difference between locking mounts 822A and 822B permits a shingling effect of the PV module 812, as described above, where the lock rail 800 is positioned at an angle, E, relative to the support rail 820. In one embodiment, the lock rail 800 may contact the support rail at a distal end 850, though such is not required.

Referring now to FIGS. 14 and 15, there are illustrated two embodiments of alternative lock spring configurations that provide retention of the lock rail to the retaining pin and thus, to the support rail. As shown in FIG. 14, the solar panel 12a is fixed to a lock rail 900 in a manner as described above in conjunction with other embodiments. The lock rail 900 includes a locking aperture 932 that is configured the same as locking aperture 32 of FIG. 3A. The locking aperture 932 includes a central aperture 934 and a pair of opposed slots 936, though, alternatively one slot 936 may be provided. The lock rail 900 includes a lock spring 910 that is attached to the lock rail 900 at two points 912a and 912b. Alternatively, the lock spring 932 may be a cantilever spring, similar to those described above, with the cantilever deflection angle oriented toward a button-head of a retaining pin 906 attached to a support rail 920. In the illustrated embodiment, the support rail 920 and retaining pin 906 do not have a lock spring connected and acting between the support rail 920 and the lock rail 900. The lock spring 910 acts to apply a biasing force onto the retaining pin 906, generally in the direction of arrow B1, such that a frictional engagement acts between the contact of the button-head of the retaining pin 906 and the inner surface of the lock rail 900. Alternatively, the lock spring 910 may be used in conjunction with the embodiments of FIGS. 10A-B and 12A-C, with or without the lock springs 400 and 308, respectively, as described above.

The lock spring 910 is attached to the lock rail 900 in any suitable manner, such as by welding, adhesive bonding, mechanical fastening, tab and slot connections, and the like. The lock spring 910 is illustrated having two connection points 912 that point towards each other, however, the connection points 912 may be oriented outwardly, if desired. The lock spring 910 permits entry of the retaining pin 906 through the central aperture 934, either by a clearance or by deflecting in response to moving the PV module into the assembling position. The lock rail 900 and solar panel 12a are moved such that the slot 936 engages the shank of the retaining pin 906, as described above. The lock spring 910 exerts the biasing pressure along B1 onto the top of the retaining pin 906 to create the frictional engagement between the button-head and the lock rail. In addition, additional augmenting locking features, such as dimples, ribs, serrations, and the like may be applied to the contacting surfaces of the support rail 920 and the lock rail 900, in particular in the vicinity of the locking aperture 932, to provide additional resistance to movement of the lock rail 900 relative to the support rail 920.

Referring now to FIG. 15, an alternative embodiment of a lock rail 950 utilizes a lock spring 960, illustrated as a semi-elliptical lock spring, that is connected directly to the back surface of the solar panel 12a in a similar manner to attachment of the lock rail to the solar panel, described above. The lock spring 960 may be configured other than a semi-elliptical spring, and may be similar to the cantilever lock springs described above, or one or more coil springs and a cross plate acting on the retaining pin, if so desired. The lock spring 960 includes two mounting points, 962 though such is not required. The lock spring 950 exerts a force onto the retaining pin 906, acting in the direction of arrow B1 to create a frictional engagement between the retaining pin 906 and the lock rail 950.

The principle and mode of operation of this invention have been explained and illustrated in its preferred embodiment. However, it must be understood that this invention may be practiced otherwise than as specifically explained and illustrated without departing from its spirit or scope. It should be further understood that any of the features of the embodiments disclosed herein may be combined with other embodiments and still remain within the scope of the inventions.

What is claimed is:

1. A support stand for mounting a photovoltaic module, the support stand comprising:
   at least one support rail having a retaining pin defining a pin axis, the retaining pin including a shank and a button-head, the button head having at least one portion extending radially beyond the diameter of the shank;
   at least one lock rail configured to be attached to a solar panel, the lock rail having a locking aperture including a central aperture and a slot; and
   a lock spring configured to produce a biasing force, the biasing force producing a frictional engagement between the retaining pin and a portion of the lock rail such that the frictional engagement increases a force necessary to move the lock rail relative to the support rail from an engaged position where the lock rail is fixed to the support rail to a position where the retaining pin is generally aligned with the central aperture.

2. The support stand of claim 1 wherein a solar panel is attached to the lock rail to form a photovoltaic module.

3. The support stand of claim 2 wherein a first adhesive and a second adhesive attach the lock rail to the solar panel, the first adhesive having a faster bonding time than the second adhesive.

4. The support stand of claim 2 wherein at least one mounting rail is connected to the at least one support rail, the mounting rail supported by a pivot plate such that the solar panel is angularly adjustable in relationship to the sunlight rays.

5. The support stand of claim 3 wherein the lock rail includes a mounting flange and an attachment face, at least one of the first and second adhesive being applied between the mounting flange and the solar panel, the attachment face being spaced away from the solar panel such that the button head passes through the central aperture.

6. The support stand of claim 5 wherein the lock rail includes a guide wall configured to facilitate positioning of the button head toward the central aperture.

7. The support stand of claim 6 wherein the attachment face includes an upper face and a lower face separated by the guide wall, the central aperture and the slot formed in the lower face.

8. The support stand of claim 1 wherein the lock rail includes a repair aperture.

9. The support stand of claim 1 wherein the lock spring includes a mounting pad and a projection positioned at an end opposite the mounting pad, the projection configured to engage the lock rail such that the retaining pin shank is retained in the slot.

10. The support stand of claim 9 wherein the projection is one of a cup-shaped projection, a barb, and a lock hook.

11. The support stand of claim 10 wherein the lock spring includes a spacer flange defining an offset distance between the lock rail and the support rail, the offset distance providing an angle of inclination of a solar panel relative to the support rail.

12. The support stand of claim 1 wherein the lock spring is positioned at least partially between the lock rail and a solar panel.

13. The support stand of claim 1 wherein the locking aperture includes one of a recess and a retaining wall formed around the slot such that the button head secures retaining pin shank within the slot.

14. The support stand of claim 13 wherein the lock spring is configured to permit the button head to be moved out of engagement with the slot such that a solar panel can be removed from the support stand.

15. A support stand for photovoltaic modules comprising:
a plurality of lower supports arranged to form a mounting deck;
a plurality of upper supports connected to the plurality of lower supports, the upper supports having a plurality of photovoltaic modules mounted thereon;
a locking arrangement for interconnecting a selected one of the upper supports to a selected one of the lower supports, the locking arrangement defined by a retaining pin mounted on one of the selected lower and upper supports, a lock aperture provided in the other one of the selected lower and upper supports, and a spring;
the retaining pin defining an axis and having a shank and a head;
the lock aperture having a main opening and a slot extending from the main opening for receiving the retaining pin, the main opening being sized to permit the head of the retaining pin to pass through, and the slot being sized to permit the retaining pin shank to pass through but to prevent the head of the retaining pin from passing through the slot along the retaining pin axis; and
the spring is operatively connected between the selected lower and upper supports to resist movement of the selected upper support relative to the lower support.

16. The support stand according to claim 15 wherein the spring is operative to bias the head of the retaining pin against the one support provided with the lock aperture to create a frictional engagement which resists movement of the selected upper support relative to the selected lower support.

17. The support stand according to claim 15 wherein the spring includes a locking tab, the spring carried by one of the selected lower and upper supports, and the locking tab is engagable with the other one of the selected lower and upper supports to resist movement of the selected upper support relative to the selected lower support.

18. A method of assembling a photovoltaic module to a support structure, the method comprising the steps of:
a) attaching a lock rail to a solar panel to form a photovoltaic module, the lock rail having a locking aperture that includes a central aperture and at least one slot;
b) orienting a support rail for assembly of the photovoltaic module to the support rail, the support rail including a retaining pin having a head portion and a shank portion wherein the head portion has a larger geometric feature than the shank portion;
c) attaching a lock spring to one of the lock rail, the support rail, and the solar panel, the lock spring configured to bias the lock rail relative to the retaining pin;
d) locating the lock rail in relation to the retaining pin such that the head portion is generally aligned with the central aperture;
e) moving the central aperture over the retaining pin such that the bias of the lock spring is overcome and the shank portion is aligned with the slot; and
f) moving the lock rail relative to the support rail such that the shank portion enters the slot and the bias causes the head portion to contact the lock rail.

19. The method of claim 18 wherein step d) further includes the step of locating the retaining pin within spaced-apart guide walls that are positioned adjacent to the locking aperture.

* * * * *